United States Patent [19]

Marek

[11] Patent Number: 4,704,096

[45] Date of Patent: Nov. 3, 1987

[54] CROWNED SPLINES AND DEFINATION OF ROOT RADIUS THEREFOR

[75] Inventor: Scott A. Marek, Prior Lake, Minn.

[73] Assignee: Eaton Corporation, Cleveland, Ohio

[21] Appl. No.: 350,454

[22] Filed: Feb. 19, 1982

[51] Int. Cl.$^4$ .......................... F16D 3/18; F01C 1/02; B23F 5/22

[52] U.S. Cl. .................................. 464/156; 418/61 B

[58] Field of Search .................... 418/61 B, 131, 132; 464/74, 156, 158, 159, 179

[56] References Cited

U.S. PATENT DOCUMENTS

| | | | |
|---|---|---|---|
| 3,547,564 | 12/1970 | Charlson | 418/61 B X |
| 3,572,983 | 3/1971 | McDermott | 418/61 B X |
| 3,973,880 | 8/1976 | Swedberg | 464/156 X |
| 4,132,090 | 1/1979 | McDermott | 464/156 X |
| 4,253,807 | 3/1981 | Pahl | 418/61 B X |

OTHER PUBLICATIONS

Machinery's Handbook (p. 1025).

*Primary Examiner*—Daniel P. Stodola
*Attorney, Agent, or Firm*—D. A. Rowe; L. J. Kasper

[57] ABSTRACT

A drive shaft (41) is disclosed of the type having first and second sets of axially-disposed external crowned splines (39 and 43) for transmitting torque between first and second sets of internal straight splines (37 and 45). The sets of internal straight splines are relatively transversely disposed such that the drive shaft is disposed during operation at a running angle (A) relative to the axis (79) of the internal splines. Each of the external crowned splines includes a pair of tooth flanks joined at a root radius having a radius (R). The root radius (R) is related to the running angle (A) of the drive shaft by the equation $$R = C/A^2$$

In this equation, C is a constant for the particular drive shaft design, and is determined empirically to yield a minimum circular clearance between the external spline and the adjacent internal spline. With the present invention, it is possible to determine the appropriate root radius for each of a series of different drive shaft applications, having different running angles, while maintaining the desired circular clearance.

8 Claims, 7 Drawing Figures

CROWNED SPLINES AND DEFINATION OF ROOT RADIUS THEREFOR

BACKGROUND OF THE DISCLOSURE

The present invention relates to spline connections, and more particularly, to spline connections in which one of the sets of splines comprises crowned, external involute splines.

The present invention is applicable wherever a shaft is provided with a set of crowned, external involute splines which transmit torque to or from a set of straight, internal involute splines. The internal and external splines cooperate to form a universal connection, wherein the axis of the shaft having the external splines is not parallel to the axis of the element associated with the internal splines. Therefore, it should be understood that the present invention may be applied to a shaft having a single set of crowned, external splines on one end, and having a different form of universal connection means at its other end.

The invention is especially advantageous when used in a drive connection for transmitting torque between a member having pure rotational motion, and a member having both orbital and rotational motion. Such a connection is commonly found in rotary fluid pressure devices (either a pump or motor) which include a gerotor gear set, and the present invention will be described in connection therewith.

Fluid motors of the type utilizing a gerotor gear set (displacement mechanism) to convert fluid pressure into a rotary output have become popular and are especially suited for low speed, high torque (LSHT) applications. In most of the commercially available fluid motors of this type, one of the primary factors limiting the torque output capability of the motor is the strength of the drive connection which transmits torque from the orbiting and rotating member (rotor) of the gerotor gear set to the output shaft of the motor. Typically, this drive connection comprises one set of internal splines defined by the rotor, and another set of internal splines defined by the motor output shaft, and a main drive shaft (dogbone) having a set of crowned, external splines at each end thereof, in engagement with the sets of internal splines. The present invention will be described in connection with a main drive shaft of this type, having crowned, external splines at both ends, even though the invention is not so limited. In the drive connection described above, the internal splines are straight, whereas the external splines are crowned to take into account the "misalignment", or the eccentricity of the gerotor rotor relative to the axis of the output shaft.

Crowned splines are usually manufactured by a process referred to as "rise-and-fall" hobbing, especially when a large volume of production is required. When crowned, external splines are produced by this method, the set of splines normally defines a central plane, oriented perpendicular to the axis of the drive shaft, with the central plane intersecting each of the splines at the theoretical "peak" of the crown. As is well known to those skilled in the art, the crown angle, determined by the hobbing angle, of the crowned splines should be sufficient that, at any axial distance from the central plane along the external spline, there will be a clearance between the external spline and the adjacent internal spline to prevent interference between adjacent splines during operation of the device. Spline clearance is normally measured perpendicular to the flank of the external spline while the axis of the main drive shaft is oriented at its operating angle (running angle).

The present invention relates, more specifically, to the root radius of the external, crowned splines. The root radius is the radius of curvature of the root surface in the region of the central plane. In prior art crowned splines, little attention has been given to the selection of a root radius which is appropriate in view of the other design parameters of the spline connection. In most of the prior art fluid motors of the type described above, the root radius has been determined by one of two different approaches. In one case, the root radius actually approaches zero, i.e., the opposite ends of each crowned spline meet in a peak at the central plane. In the other design approach, which has been utilized commercially by the assignee of the present invention, the root radius is selected to be one-half of the minor diameter of the drive shaft, the minor diameter being the diameter of the root surface, measured at the central plane of the crown.

One aspect of the present invention is the recognition that the clearance between the internal and external splines is related to the proper selection of the root radius.

SUMMARY OF THE INVENTION

Accordingly, it is an object of the present invention to provide a spline connection of the type described above which optimizes the clearance between the internal and external splines, i.e., which achieves a clearance whereby the torque transmitting capability of the connection is maximized, without permitting interference between the internal and external splines during normal operation of the spline connection.

It is another object of the present invention to develop the relationships necessary to permit optimization of the spline clearance for various spline connection configurations.

It is a more specific object of the present invention to provide a method for determining the appropriate root radius, for different drive shaft running angles, in order to optimize the spline clearance.

In accordance with the above and other objects of the invention, an improved drive shaft is provided of the type having a set of external crowned splines for transmitting torque to or from a set of internal straight splines, the drive shaft being disposed during operation at a running angle A relative to the axis of the set of internal splines. The set of external crowned splines defines a central plane oriented generally perpendicular to the axis of the drive shaft, and each adjacent pair of the external crowned splines includes a root surface defining a root radius. The improvement comprises the root radius having a radius R which is related to the running angle A of the drive shaft by the equation $$R = C/A^Z.$$

In this equation, Z is equal to approximately 2, and C is a constant for the particular drive shaft design which is determined empirically to yield a desired circular clearance between the external spline and the adjacent internal spline.

DESCRIPTION OF THE PREFERRED EMBODIMENT

Figure 1:
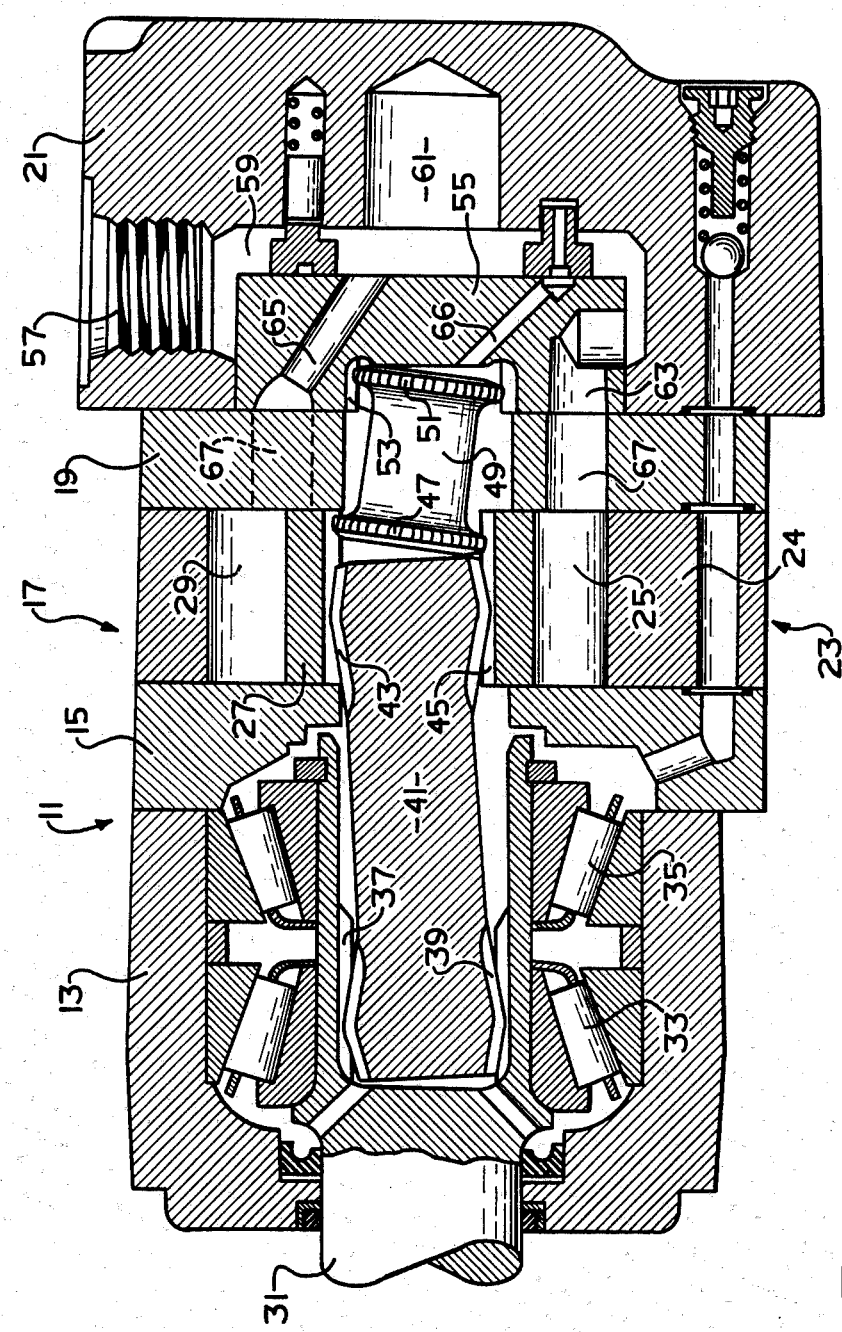
FIG. 1 is an axial cross section of a fluid pressure operated gerotor motor of the type in which the present invention is preferably utilized.

Referring now to the drawings, which are not intended to limit the invention, FIG. 1 is an axial cross section of a fluid pressure operated motor, the particular design of which forms no part of the present invention. To the extent necessary for an understanding of the present invention, reference may be made to U.S. Pat. No. 3,572,983 for additional description of the design and operation of the fluid motor.

The fluid motor, generally designated 11, comprises a plurality of sections secured together, preferably by a plurality of bolts (not shown). The motor 11 includes a shaft support casing 13, a wear plate 15, a gerotor displacement mechanism 17, a port plate 19, and a valve housing portion 21.

The gerotor displacement mechanism 17 is well known to those skilled in the art, and will be described only briefly herein. More specifically, in the subject embodiment, the displacement mechanism 17 is a Geroler ® displacement mechanism comprising an internally-toothed assembly 23. The assembly 23 includes a stationary ring member 24 defining a plurality of semi-cylindrical openings, and rotatably disposed in each of the openings is a cylindrical roller member 25, the rollers 25 comprising the internal teeth of the assembly 23. Eccentrically disposed within the assembly 23 is an externally-toothed rotor member 27, typically having one less external tooth than the number of roller members 25, thus permitting the rotor 27 to orbit and rotate relative to the assembly 23. The relative orbital and rotational movement between the assembly 23 and the rotor 27 defines a plurality of expanding and contracting volume chambers 29.

Referring still to FIG. 1, the motor 11 includes an input-output shaft 31, positioned within the shaft support casing 13 and rotatably supported therein by suitable bearing sets 33 and 35. The shaft 31 defines a set of internal, straight splines 37, and in engagement therewith is a set of external, crowned splines 39 formed on one end of a main drive shaft 41. Disposed at the opposite end of the shaft 41 is another set of external, crowned splines 43 which are in engagement with a set of internal, straight splines 45, formed on the inside of the rotor 27. Therefore, in the subject embodiment, because the assembly 23 includes six internal teeth 25, and the rotor 27 includes seven external teeth, seven orbits of the rotor 27 result in one complete rotation thereof, and one complete rotation of the drive shaft 41 and output shaft 31.

Also in engagement with the internal splines 45 is a set of external splines 47 formed about one end of a valve drive shaft 49 which has, at its opposite end, another set of external splines 51. The splines 51 are in engagement with a set of internal splines 53 formed about the inner periphery of a valve member 55. The valve member 55 is rotatably disposed within the valve housing 21, and by means of the shaft 49, rotates at the speed of rotation of the rotor 27, as is generally well known in the art.

The valve housing 21 includes a fluid port 57 in communication with an annular chamber 59 which surrounds the valve member 55. The valve housing 21 also includes another fluid port (not shown) which is in fluid communication with a fluid chamber 61. The valve member 55 defines a plurality of alternating valve passages 63 and 65, the passages 63 being in communication with the chamber 59, while the passages 65 are in communication with the chamber 61. The valve member 55 also defines a case drain passage 66, providing communication to the central, case drain region of the motor.

The port plate 19 defines a plurality of fluid passages 67, each of which is disposed to be in continuous fluid communication with the adjacent volume chamber 29. The structural details of the fluid motor 11, and its operation, will not be described further herein.

FIGS. 2-6

Figure 5:
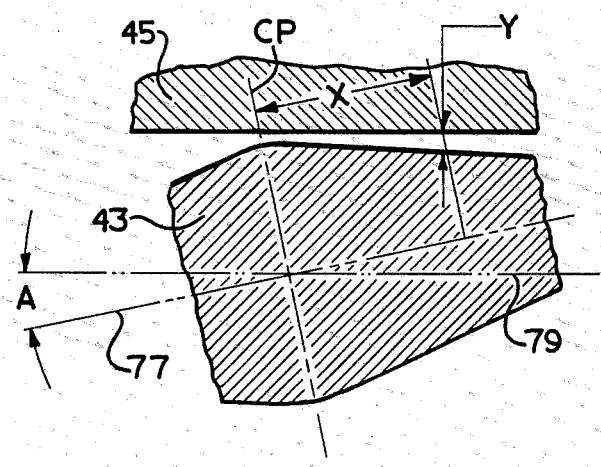
FIG. 5 is an axial cross section, taken on line 5—5 of FIG. 4, and on generally the same scale as FIG. 4, illustrating the varying clearance between the internal and external spline over the spline length.
Figure 4:
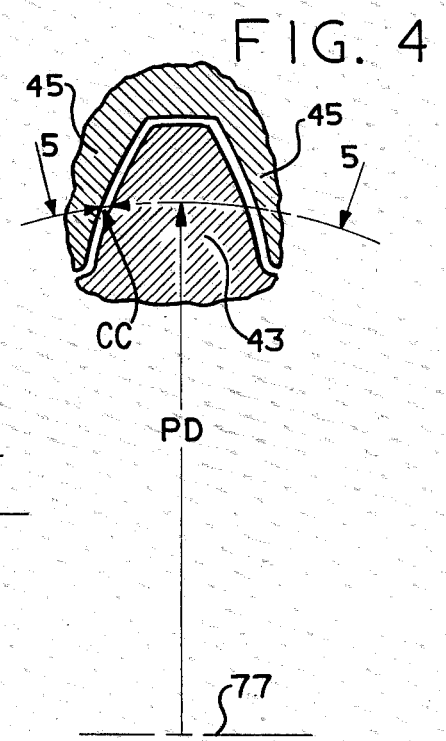
FIG. 4 is a fragmentary, transverse cross section of an external crowned spline, disposed between a pair of adjacent internal splines.

Referring now to FIGS. 2–5, each is a different view of one of the crowned, external splines 43, and FIGS. 4 and 5 include one or more of the straight, internal splines 45. The purpose of FIGS. 2–5 is to illustrate the various dimensions and variables which are involved in the present invention.

Figure 2:
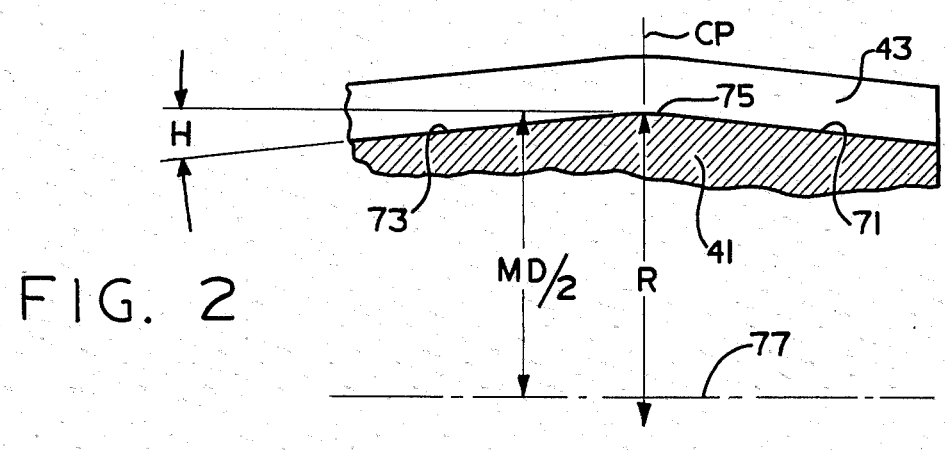
FIG. 2 is an enlarged, fragmentary view, similar to FIG. 1, illustrating an external crowned spline, made in accordance with the present invention.
Figure 3:
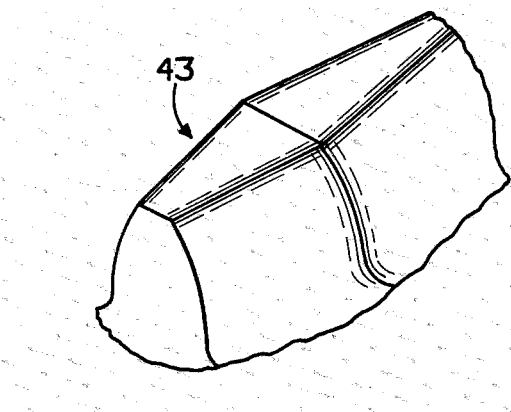
FIG. 3 is a further enlarged, fragmentary perspective view of a crowned external spline, included merely to illustrate the general configuration thereof.

Referring first to FIG. 2, the crowned splines 43 define a root surface 71 and a root surface 73. The root surfaces 71 and 73 meet at the central plane CP of the spline 43, and at the point of intersection, define a minor diameter MD of the drive shaft 41 (MD/2 being shown in FIG. 2 to save space). The angle of the root surfaces 71 and 73, relative to an axis 77 of the drive shaft 41 (or a line parallel thereto) comprises a hobbing angle H. The hobbing angle H is an indication of the path of travel of the hobbing cutter (not shown) as it passes from the right end of the spline 43 toward the left end thereof. In making the transition from the root surface 71 to the root surface 73, the hobbing cutter hobs a curved surface portion 75 in the region of the central plane CP. The radius of curvature of this surface portion 75 defines a root radius R. It is the determination of the root radius R, and the variation of the root radius R with the variation in other dimensions which comprises the essence of the present invention.

Referring now to FIG. 4, which is preferably taken on the central plane CP, there is included in the view a pair of adjacent internal straight splines 45. FIG. 4 illustrates the pitch diameter PD of the spline 43, which is measured from the axis 77 of the drive shaft 41. FIG. 4 further illustrates the circular clearance CC which is the distance between the internal spline 45 and the external spline 43, measured at the pitch diameter of the spline 3, and in a direction along the pitch diameter of the spline 43.

In FIG. 5, there is illustrated a line 79 which is representative of the axis of the internal splines 45. The angle defined by the axis 77 of the shaft 41, relative to the line 79, is the running angle A of the shaft 41, i.e., the "wobble" angle at which the shaft 41 operates relative to the axis of the motor 11.

FIG. 5 also illustrates the dimensions which are relevant to the clearance plot shown in FIG. 6, which will be described subsequently. In FIG. 5, for any given distance X along the length of the spline 43 from the central plane CP, there is a corresponding clearance Y between the internal spline 45 and the external spline 43. When X equals zero (at the central plane CP), Y equals CC.

As was discussed in the background of the present specification, it is desirable to optimize the clearance Y, at any point X along the spline, to maximize the engagement between the internal and external splines, without having interference therebetween, especially near the end of the shaft. During the development of the present invention, it was observed that as the root radius R is varied, the clearance Y varies. Also, when the drive running angle A is varied, the clearance Y varies again. Therefore, in accordance with the present invention, for any given design of shaft 41, it is possible to change the root radius R, as a function of the running angle A to maintain the optimum clearance Y. As a result, it is possible to design motors having gerotor displacement mechanisms of many different displacements (different rotor eccentricities and running angles), and by varying the root radius R on the drive shaft 41, as a function of the different running angles, each of the spline connections can have the same optimum spline clearance Y for maximum torque transmission capability.

Figure 6:
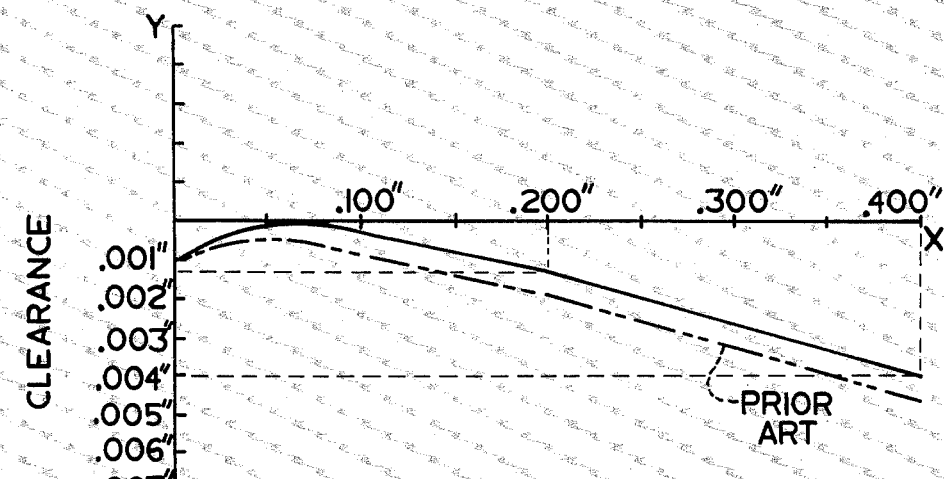
FIG. 6 is a clearance plot, illustrating the clearance between the internal and external splines, from the crowned central plane along the spline length.

Referring now to FIG. 6, there is shown a graph of clearance Y as a function of distance X from the central plane CP. In the subject embodiment of the invention (solid line in FIG. 6), the "optimum" clearance plot is considered to be one in which the clearance between the splines is minimum, i.e., the plot just touches the X axis. If the plot were to extend above the X axis, it would be an indication of a theoretical "intereference" condition between the external spline and internal spline. It may be expected that the minimum clearance position would occur at the central plane CP (X=0 in FIG. 6), but it may be seen in FIG. 6 that the minimum clearance position actually occurs at about X=0.070 inches from the central plane. It will be understood by those skilled in the art that this occurs because of the curved surface portion 75 being oriented at the running angle A relative to the adjacent internal spline 45.

Referring still to FIG. 6, it should be noted that at a point about 0.200 inches from the central plane CP, the hobbing angle H was increased by one degree, to obtain a slightly greater clearance Y at the end of the tooth (X=0.400 inches) than would have been the case if the hobbing angle H had been maintained over the entire tooth length. Thus, in the subject embodiment, the splines 43 utilize what may be referred to as a "double angle" hobbing cut. However, this is not an essential feature of the present invention.

Formula Derivation

As was mentioned in the background of the specification, one object of the present invention was to develop relationships which would permit optimization of the spline clearance for difference spline connection configurations. Accordingly, one aspect of the present invention is the derivation of a formula which, for any given drive shaft and spline connection configuration, will permit the calculation of the root radius R as a function of the running angle A. In deriving the formula, certain assumptions were made, or observed, as defining the limits on the general usability of the derived formula. These underlying assumptions include the following:

1. Both the external spline 43 and the internal spline 45 are involute;

2. The minimum effective theoretical clearance (space width minus tooth width) between the splines at the central plane CP is about 0.002 inches;

3. The pressure angle of the external splines 43 is greater than 20 degrees and less than 35 degrees; and 4. The running angle A is equal to or greater than 1 degree and equal to or less than 4 degrees.

In deriving the formula for the root radius, a number of input variables (i.e., spline connection dimensions) were considered. These variables will not all be specifically mentioned at this point, but will be listed as part of the working example of the invention included hereinafter. In deriving the formula for determining the root radius R, use was made of a spline contact analysis program to generate the clearance plots of the type shown in FIG. 6. In addition, use was made of a best-fit curve program to determine the general form of the equation relating the root radius R to the running angle A. It is believed that it would be within the ability of those skilled in the art to use these programs to duplicate the derivation to be described hereinafter, subsequent to a reading and understanding of this specification.

In order to understand the derivation of the formula, it is necessary to understand what effect changing certain variables has on the clearance plot shown in FIG. 6. The radius of curvature of the arcuate portion of the clearance plot is generally proportional to the root radius R, and to some degree, the clearance (i.e., the vertical distance between the plot and the X axis) is a function of R. The slope of the linear portion of the clearance plot is a direct function of the hobbing angle H. Finally, the vertical location of the clearance plot relative to the X axis (but not the actual shape of the clearance plot) is determined by the running angle A of the drive shaft 41.

With all input variables kept constant, except for R and A, the spline contact analysis program was used, varying both the root radius R and the running angle A, to generate a series of clearance plots. From among all of the clearance plots generated, those in which the clearance was optimized (minimized) as in FIG. 6 were selected, and the root radius R was plotted as a function of the running angle A for each of the selected, optimized clearance plots. The best-fit curve program was applied to the resulting plot of R vs. A (the solid curve in FIG. 7), and the result was an equation of the form:

$$R = C/A^2 \tag{1}$$

wherein C is a constant which then had to be determined empirically, to yield the optimized clearance plot for all spline connection configurations within the limits listed above. Although the running angle A is raised to the second power in equation (1); it should be noted that the exponent does not have to be exactly 2, but could vary, for example between about 1.8 and about 2.2. For purposes of the subsequent description, the derivation steps described above (i.e., using the spline contact analysis and best-fit curve programs) will be referred to as Steps 1 and 2, respectively.

Steps 1 and 2 were repeated several times, each time using a different diametral pitch (DP, not shown in drawings), which had been kept constant during the original Steps 1 and 2. The result was a new value of C for each time Steps 1 and 2 were repeated. A plot was then made of C as a function of diametral pitch (DP) which resulted in a linear equation of the form:

$$C = M(DP) + B \quad (2)$$

wherein M and B (and $M_1$, $M_2$, $B_1$, and $B_2$ to be used subsequently are constants which are generated by use of the best-fit curve program.

Next, Steps 1 and 2 were repeated again several times, each time using a different hob pressure angle (PA, not shown in drawings) resulting in a new series of values for C. A plot was then made of M as a function of hob pressure angle (PA), resulting in a linear equation of the form:

$$M = M_1(PA) + B_1 \quad (3)$$

Next, a plot was made of B as a function of hob pressure angle (PA) resulting in another linear equation, this one being of the form:

$$B = M_2(PA) + B_2 \quad (4)$$

The next step was to substitute equation (3) for the quantity M in equation (2), and to substitute equation (4) for the quantity B in equation (2), resulting in an equation of the general form:

$$C = M_1(PA)(DP) + B_1(DP) + M_2(PA) + B_2 \quad (5)$$

Finally, by substituting the appropriate numerical values for $M_1$, $M_2$, $B_1$, and $B_2$ in equation (5), the result is the following specific equation for the constant C:

$$C = -(0.0066)(PA)(DP) - (0.045)(DP) + (0.175)(PA) + 0.85 \quad (6)$$

Therefore, by using equation (6) and inserting the hob pressure angle and the diametral pitch for any given spline connection, it is possible to calculate the constant C. The calculated C may then be used in equation 1 to determine the appropriate root radius R for any running angle A of the drive shaft 41. As was mentioned previously, it is then possible to achieve the desired, optimum spline clearance for each and every displacement in a motor series.

EXAMPLE

This example is included to illustrate the use of the present invention on an actual spline connection. As part of this example, there is included a listing of all the input variables (spline connection dimensions) which must be known or determined in order to practice the present invention. Certain of the variables listed have previously been introduced in connection with the description of the drawings, whereas certain other variables are being referenced for the first time. It is believed that all of the variables listed hereinafter are well known to those skilled in the art, and that no additional explanation of any of the variables is required. The input variables are divided into two groups, those relating to the hob, and those relating to the spline connection itself.

| variable | dimension |
|---|---|
| hob | |
| hob pressure angle | 37 degrees |
| hob addendum | .045 inches |
| normal tooth thickness | .0774 inches |
| hob tip radius | .010 inches |
| spline | |
| diametral pitch (DP) | 12 |
| minor diameter MD | .0846 inches |
| number of teeth | 12 |
| spline pressure angle | 30 degrees |
| tooth thickness (at PD) | .1638 inches |
| hobbing angle H | 3.875 degrees |
| running angle A | 2.069 degrees |
| internal space width (at PD) | .1658 inches |

By substituting the hob pressure angle (PA) of 37 degrees and the diametral pitch (DP) of 12 into equation (6), it is possible to solve the equation for the constant C. With the input variables given in this example, C=3.855, and therefore, equation (1) may now be rewritten as follows:

$$R = 3.855/A^2$$

Substituting in this equation the known running angle A of 2.069 degrees results in:

$$R = 3.855/(2.069)^2 = 0.900 \text{ inches}$$

In the various other spline connections and motor displacements with which the present invention has been utilized, the constant C has varied anywhere from about 3.0 to about 5.0. It is believed that, for most applications of the present invention, especially LSHT motors, the constant C will fall within the range.

Figure 7:
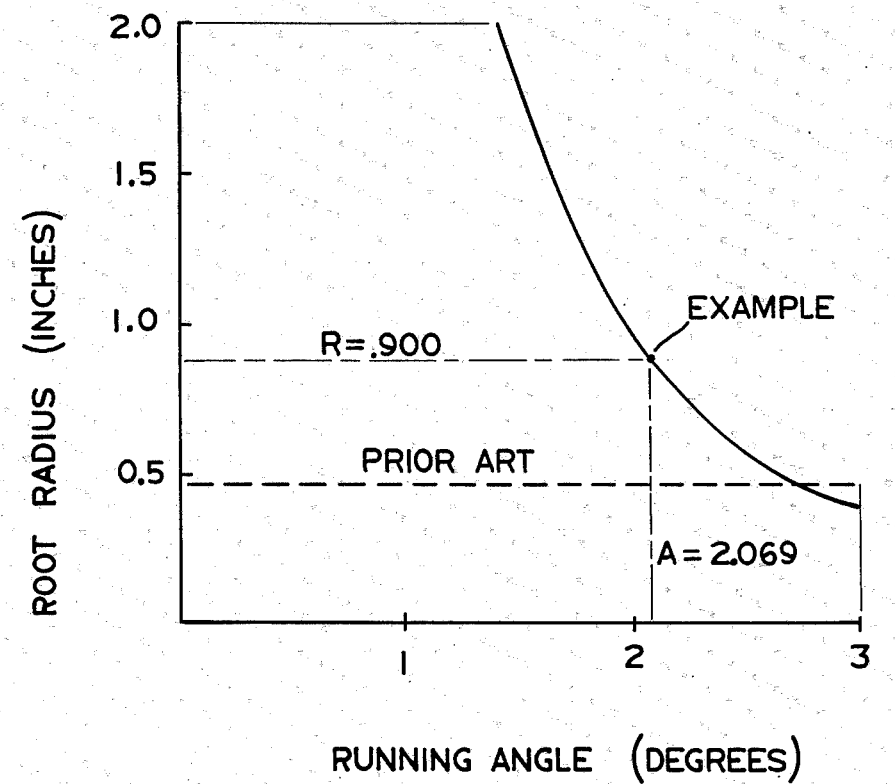
FIG. 7 is a graph of root radius vs. drive shaft running angle, comparing the present invention with the prior art.

Referring again to the graph of root radius vs. running angle shown in FIG. 7, there is illustrated a point on the curve, labeled "Example" which corresponds to R=0.900 and A=2.069. As may be seen from the curve, increasing the running angle A requires that the root radius R be reduced (in accordance with equation 1) in order to maintain the optimum clearance plot shown in FIG. 6.

What is claimed is:
1. In a drive shaft of the type having first and second sets of axially-disposed external crowned splines for transmitting torque between first and second sets of internal straight splines, the sets of internal straight splines being relatively transversely disposed such that the drive shaft is disposed during operation at a running angle A relative to the axes of the sets of internal splines, each of the sets of external crowned splines defining a central plane oriented generally perpendicular to the axis of the drive shaft, each of said sets of external crowned splines including a root surface defining a root radius; the improvement comprising:
   the root radius having a radius R which is related to the running angle A of the drive shaft by the equation

$$R = C/A^Z;$$

wherein Z is equal to approximately 2 and C is a constant for the particular shaft design which is determined empirically to yield a minimum circular clearance between the external spline and the adjacent internal spline.

2. In a drive shaft for transmitting torque between first and second elements, said drive shaft and said first and second elements cooperating to define first and second universal connection means, respectively, said first universal connection means comprising said drive shaft defining a set of external crowned splines, and said first element defining a set of internal straight splines, said drive shaft being disposed during operation at a running angle A relative to the axis of said internal splines, said set of external splines defining a central plane (CP) oriented generally perpendicular to the axis of said drive shaft, said set of external crowned splines including a root surface defining a root radius, the improvement comprising:

the root radius having a radius R which is a function of the running angle A of said drive shaft by the equation $$R = C/A^Z$$

wherein Z is equal to approximately 2 and C is a function of the hob pressure angle (PA) and the spline diametral pitch (DP) and is a constant for the particular drive shaft which is selected to yield a desired circular clearance (CC) between the external spline and the adjacent internal spline.

3. The improvement as claimed in claim 1 or 2 wherein the running angle A is between about one degree and about four degrees.

4. The improvement as claimed in claim 1 or 2 wherein the pressure angle of the set of external splines is between about 20 degrees and about 35 degrees.

5. The improvement as claimed in claim 1 wherein the constant C is a function of the hob pressure angle and the diametral pitch of the set of external splines.

6. The improvement as claimed in claim 5 wherein the constant C is determined by an equation of the general form:

$$C = M_1(PA)(DP) + B_1(DP) + M_2(PA) + B_2$$

wherein (PA) is the hob pressure angle and (DP) is the diametral pitch of the set of external splines, and wherein $M_1$, $B_1$, $M_2$, and $B_2$, are constants which are determined empirically to yield, for the given (PA) and (DP), the minimum circular clearance between the external spline and the adjacent internal spline.

7. The improvement as claimed in claim 6 wherein:
$M_1$ equals about $-0.0066$
$B_1$ equals about $-0.045$
$M_2$ equals about $0.175$
$B_2$ equals about $0.85$.

8. The improvement as claimed in claim 1 or 2 wherein the constant C is in the range of about 3.0 to about 5.0.

* * * * *